United States Patent [19]
Jamaleddin et al.

[11] Patent Number: 5,448,633
[45] Date of Patent: Sep. 5, 1995

[54] TELECOMMUNICATIONS SYSTEM FOR CONTROLLING ACCESS TO A DESTINATION

[75] Inventors: Barbara H. Jamaleddin, Lotawana, Mo.; Adrian Toader, Overland Park; Jose A. Valdez, Olathe, both of Kans.; Ruben J. Zaragoza, Kansas City, Mo.

[73] Assignee: Spring Communications Company L.P., Kansas City, Mo.

[21] Appl. No.: 220,761

[22] Filed: Mar. 30, 1994

[51] Int. Cl.$^6$ .............................................. H04M 3/42
[52] U.S. Cl. .................... 379/201; 379/265; 379/95
[58] Field of Search ............... 379/201, 202, 207, 97, 379/88, 230, 127, 67, 112, 142, 188, 265, 266, 309, 221, 220, 95, 94, 93, 91, 89

[56] References Cited

U.S. PATENT DOCUMENTS

| | | | |
|---|---|---|---|
| 4,191,860 | 3/1980 | Weber | 379/115 |
| 4,611,094 | 9/1986 | Asmuth et al. | 379/201 |
| 4,706,275 | 11/1987 | Kamil | 379/144 |
| 5,164,983 | 11/1992 | Brown et al. | 379/207 |
| 5,181,238 | 1/1993 | Medamana et al. | 379/97 |

OTHER PUBLICATIONS

"Schwab Telebroker Service" Brochure; Oct. 1993; Charles Schwab & Co. p. 9, cover, back, figure.

Primary Examiner—James L. Dwyer
Assistant Examiner—Scott Wolinsky
Attorney, Agent, or Firm—Harley R. Ball; Michael J. Setter

[57] ABSTRACT

The present invention is a telecommunications system for allowing a business to control customer service. The system is comprised of a switching network and an enhanced services platform. Calls from the customer to the business are routed to the enhanced services platform by the switching network. Using codes acquired from the customer and the switching network, the enhanced services platform identifies a program specified by the business and also retrieves customer information. The information contains an account of telecommunications available, and the customer is connected to the business as long as a pre-determined amount is in the account. Action is taken when a second pre-determined amount remains. The customer is allowed to refresh the account and the enhanced services platform is capable of collecting information from the customer as a prerequisite to customer service.

30 Claims, 7 Drawing Sheets

TELECOMMUNICATIONS SYSTEM FOR CONTROLLING ACCESS TO A DESTINATION

BACKGROUND

1. Field of the Invention

The invention relates to telecommunications systems and specifically to a system that controls access to a destination.

2. Description of the Prior Art

Providing customer service is an integral part of many businesses. At present, many businesses use "800" numbers to provide this customer service, such as allowing their customers to call with questions, comments, orders, and the like. Customers of a business typically use the same "800" number regardless of differences in the characteristics of the customer, such as the purchase amount or sophistication. In addition, "800" numbers are also obtained and used by individuals who are not customers of the business.

This access and use of customer service systems leaves the business with significant problems. The business must pay for customer service for all customers, and even for non-customers who obtain the "800" number. These costs include the increased telecommunications cost and the business internal customer service cost as a result of servicing additional customers. Additionally, customers who obtain the same "800" number may be processed uniformly despite the differences specific to each customer. In order to avoid consumer confusion, most businesses choose not to offer more than one "800" number. This hinders the business ability to tailor "800" service to each specific customer or group of customers.

Some typical problems facing businesses who offer an "800" number or other unrestricted access to customer service include the following. Customers may abuse available customer service which drives up the cost of the product for the other customers. This abuse of service may force other customers to wait in a phone queue before gaining access to customer service. Additionally, some customers may desire not to pay for sophisticated customer service that they do not need.

As for the business, it may desire to limit the amount of free customer service it will provide. The business may also want to limit the resources it expends on customer service. Limiting access to customer can enable the business to maintain a level of quality of the service provided to its customers. At present "800" customer service systems use a "one size fits all" approach that is insensitive to the resources of the business and the specific needs of the customer.

Another telecommunications feature is the pre-pay card. The pre-pay card is typically a pre-paid account against which telephone use is billed. Pre-pay cards, however, do not allow a business to control customer service. Pre-pay cards do not control the destination of the call. A business issuing pre-pay cards has no way of directing calls using the pre-pay card to its customer service line. It is well known that the use of pre-pay cards has been accompanied by fraud and abuse. The fraud and abuse is due in part to the lack of control the party who pays for the telecommunications usage has over the destinations of the actual calls.

Automatic Number Identification (ANI) has been used in prior systems to block calls. However, these systems only allow or reject calls from a specific origination telephone number. They are not tied to specific individual callers. Additionally, they only prevent connections based on a telephone number. They do not track and update accounts. They do not allow for call processing that is flexible and specific to each customer and business relationship.

Two problems can be seen with current systems. First, "800" systems direct customer service calls to a specific business which pays for the call, but customer service is typically applied uniformly to all callers of a particular number. Secondly, pre-pay cards are specific to each customer, but they do not direct calls to the customer service line of a particular business.

For the above reasons, there is a need for a telecommunications system that allows the business to control customer service. This system would allow the business to design customer service around the specific needs of both the customer and the business.

SUMMARY

The present invention allows a destination to control the access it desires to its telecommunications lines, and allows calls to be specially processed. The present invention is applicable as a telecommunications system that satisfies the need of allowing a business to control customer service with regard to individual customers, or groups of customers. This system applies to situations in which a customer obtains an access code and a telephone number that is associated with a business. The telephone number also corresponds to a program code. The system includes a telecommunications network that accepts calls and transmits signaling associated with the calls. This network also can make call connections. Network routing instructs the network to connect the customer to an interface when the customer places a call using the telephone number associated with the business.

The interface accepts calls and their program codes from the network. The interface also collects access codes from the customers. A processor processes the calls accepted by the interface and retrieves programs stored in a database based on the program codes. The processor also retrieves accounts from the database showing the amount of customer service telecommunications remaining for the access codes. If a pre-determined amount of telecommunications is in an account, network routing instructs the network to connect the interface to the business. This completes a connection from the customer to the business. If not, the network is instructed to implement pre-selected instructions, such as to disconnect the customer to business connection. The processor tracks the amount of telecommunications used by the customer, and updates the account with the current amount if such an update is necessary. The network may implement the preselected instructions when a second pre-determined amount is in the account.

The system also allows customers to purchase additional telecommunications usage, or in one embodiment, to eliminate the need for an access code and purchase customer telecommunications on a call by call basis. Additionally, the system can be used to collect customer information and make announcements to the customers. Both of these features can be made a prerequisite to obtaining customer service.

This system offers numerous advantages over prior art systems. It provides businesses with a telecommunications system that allows the business to control customer service. The system offers easy telephone access to the customer from any phone connected to the public network. This is required in today's market to ensure the business of a high level of participation by the customers. Unlike the prior art systems, however, the business is given the means to control this capability in a new way. By using program codes and access codes, the business can specify specific call processing instructions for each individual customer.

BRIEF DESCRIPTION OF THE DRAWINGS

These and other features, aspects, and advantages of the present invention will become better understood with regard to the following description, claims, and drawings where:

DESCRIPTION

Figure 1:
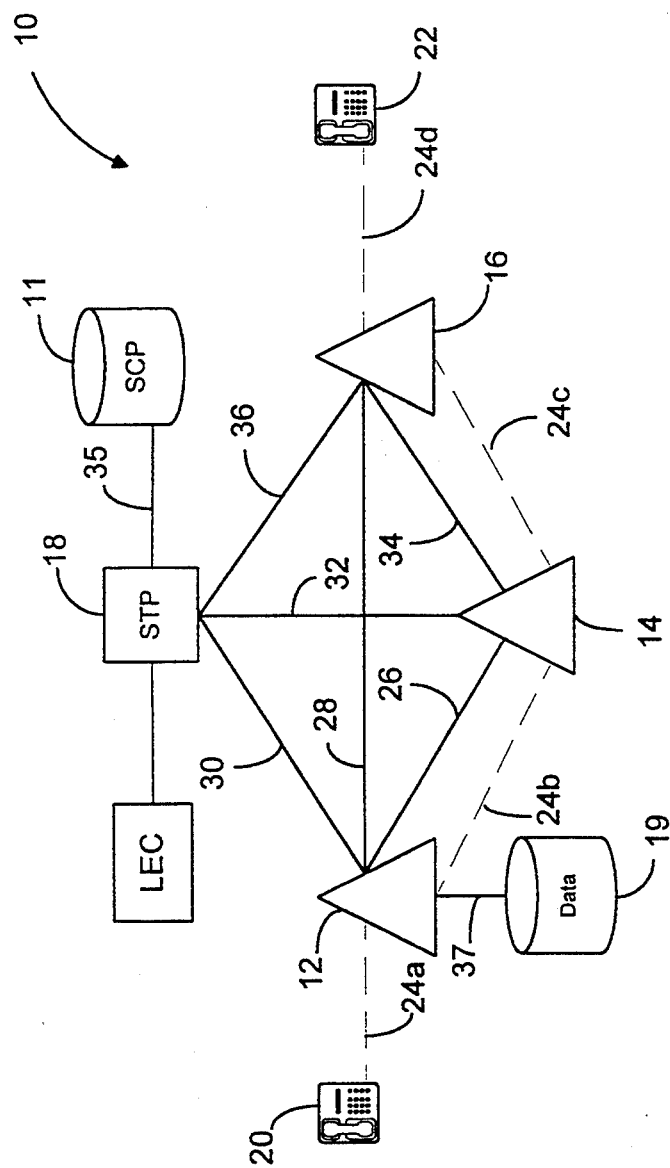
FIG. 1 is a block diagram of a version of the present invention.

FIG. 1 illustrates the basic structure of one embodiment of the present invention. Customer 10 is a typical customer of a product or service and has a calling device such as a telephone, modem, facsimile, or other calling device. The calling device is connected to Switching Network 20 over one of the various types of connections that are well known in the art. Examples would be public switched lines, cellular radio, microwave, or dedicated lines. Switching Network 20 is a telecommunications system capable of accepting, routing, signaling, and connecting calls from a caller to a destination. Switching Network 20 is connected to Enhanced Services Platform (ESP) 25 over dedicated access lines (DALs). An example of a DAL is a T1. ESP 25 could also be incorporated as a part of Switching Network 20. Switching Network 20 transmits calls and standard call information to ESP 25 over these DALs. Switching Network 20 is connected to Business 30 in a way known to those skilled in the art. Examples are switched lines, cellular radio, microwave, and dedicated lines.

ESP 25 is a system which typically will comprise the following two capabilities. It has a database capability to store information and a processing capability to process calls. ESP 25 is capable of accepting calls and prompting customers for DTMF, digital, or voice information. ESP 25 is also capable accepting call information provided by Switching Network 20. ESP 25 can use this information, along with stored information and programs, to process calls. ESP 25 can also generate calls and connect them with the calls it has accepted in order to form a seamless connection from Customer 10 to Business 30. Other features of ESP 25 will become apparent.

In one embodiment, Customer 10 will have an access code and a telephone number associated with Business 30. There will also be a program code which corresponds to a particular call processing program specified by Business 30. The program code and the telephone number of Business 30 are related and may even be the same number. When Customer 10 attempts to connect to Business 30 by using the telephone number, Switching Network 20 routes the call and a program code to ESP 25. ESP 25 obtains the program code from Switching Network 20 and the access code from Customer 10. ESP 25 then applies corresponding limitations and features before allowing Switching Network 20 to make the connection to Business 30. Business 30 can correspond numerous limitations and features to each program code and access code that can be applied by a telecommunications system. The correspondence resides in a telephone number-program code-access code correlation. ESP 25 may also apply limitations and features during the connection.

ESP 25 controls access to the customer service telecommunications line of Business 30. It also tracks the connections to the customer telecommunications lines made through Switching Network 20 by Customer 10 using the access code. Additionally, ESP 25 can collect information from Customer 10 for later processing, or for delivery to Business 30.

Figure 2:
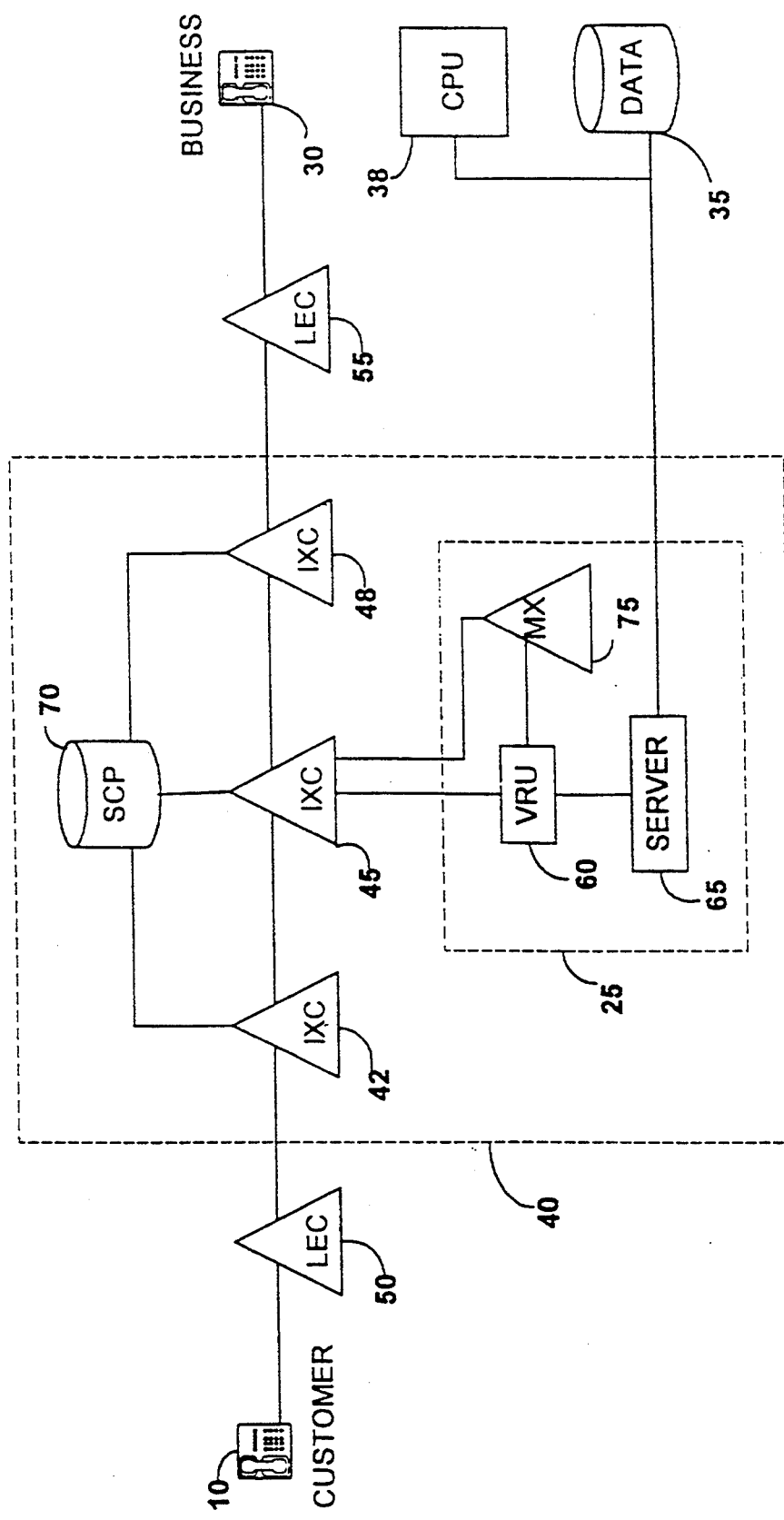
FIG. 2 is a block diagram of a version of the present invention.

FIG. 2 illustrates the structure of one embodiment of the present invention in greater detail. Switching Network 20 (not shown) is now represented by Interexchange Carrier (IXC) 40 and Local Exchange Carrier (LEC) Switches 50 and 55. LEC Switches and their connections are familiar to those skilled in the art. Customer 10 is connected to LEC Switch 50. LEC Switch 50 is connected IXC Switch 42. IXC Switches are also well known. They are typically connected by trunk groups, but other connections are also well known. IXC Switch 45 is connected to IXC Switch 48 which is connected to LEC Switch 55. LEC Switch 55 is connected to Business 30. The IXC switches are also connected to Service Control Point (SCP) 70 with standard data links. Using standard signaling, such as SS7, the IXC switches can query SCP 70 for information required to complete a call. SCPs are known in the art, as are their connections and operation. Those skilled in the art will understand these components and connections. They will also understand that a telecommunications network has numerous switches that are interconnected with many call connections and signaling links. FIG. 2 omits some of this material for clarity.

ESP 25 is now depicted as comprised of three components—VRU 60, Server 65, and Matrix Switch 75. VRU 60 represents a voice response unit system. An example of an individual voice response unit is the Brite Voice Systems Model 5000. IXC Switch 45 is connected to VRU 60. This connection is comprised of DALs, but other well known connections could be used. A VRU system could be comprised of one device, or of several devices that are interconnected. The preferred form of the VRU system is multiple VRU groups each comprised of individual VRUs connected by an Ethernet LAN. These groups are then connected through routers to form an Ethernet WAN. The different groups are located in different physical locations for purposes of redundancy, and calls are allocated to each group based on standard "800" routing features.

VRU 60 and Server 65 are preferably connected to the same Ethernet LANs, but other connections are known. As with VRU 60, Server 65 might comprise a single device or interconnected devices. An example of a server is the Tandem Model Himalaya. The preferred form of the system is multiple servers in different physical locations with each server being connected to one of the Ethernet LANs used to form the VRU groups.

ESP 25 typically comprises both processing and data storage capability. Typically, both capabilities are distributed among the VRU and the Server. Both of these devices have processing and data storage capability, however one skilled in the art will recognize that other distributions are possible. This might be the elimination of one of the devices and the concentration of both processing and storage capabilities in the other device. Those skilled in the art will understand how processing and data storage can be distributed among these devices, discreetly separated between the devices, or concentrated in one of the devices.

The data storage capability residing in VRU 60, Server 65 and Matrix switch 75 is loaded with customer information and programs. Additionally, Server 65 could be connected to database 35 over a data link such as X.25 or a 56 kbit line. Database 35 would be a database controlled by the customer. It could be accessed for call processing, but controlled and updated by the business or a service bureau. Data storage could then be distributed between ESP 25 and database 35.

Additionally, Server 65 could be similarly connected to CPU 38 controlled by Business 30. Using this connection, Server 65 could provide Business 30 with specific customer information files contemporaneously with the calls. In the preferred embodiment, the last four digits of the ANI field would be used as a sequence number. This sequence number would be transmitted to CPU 38 along with the customer information file in order to allow the business to correspond the files to the calls.

Although those skilled in the art are aware that the VRU is capable of cross-connecting calls, it is preferred that a separate switching component be added to facilitate this task. As such, VRU 60 is also connected to Matrix Switch 75 by a DAL using Feature Group D, but other connections are also known. An example of Matrix Switch 75 is the Summa Four Inc. Model SDS-1000. Matrix Switch 75 is connected to IXC switch 45 with standard trunk lines. FIG. 2 represents a telecommunications system able to connect a customer and a business. The system is connected to an intelligent platform that can apply special processing to calls from the customer to the business. The special processing allows the business to control customer service in a manner superior to that offered by previous systems.

Figure 3:
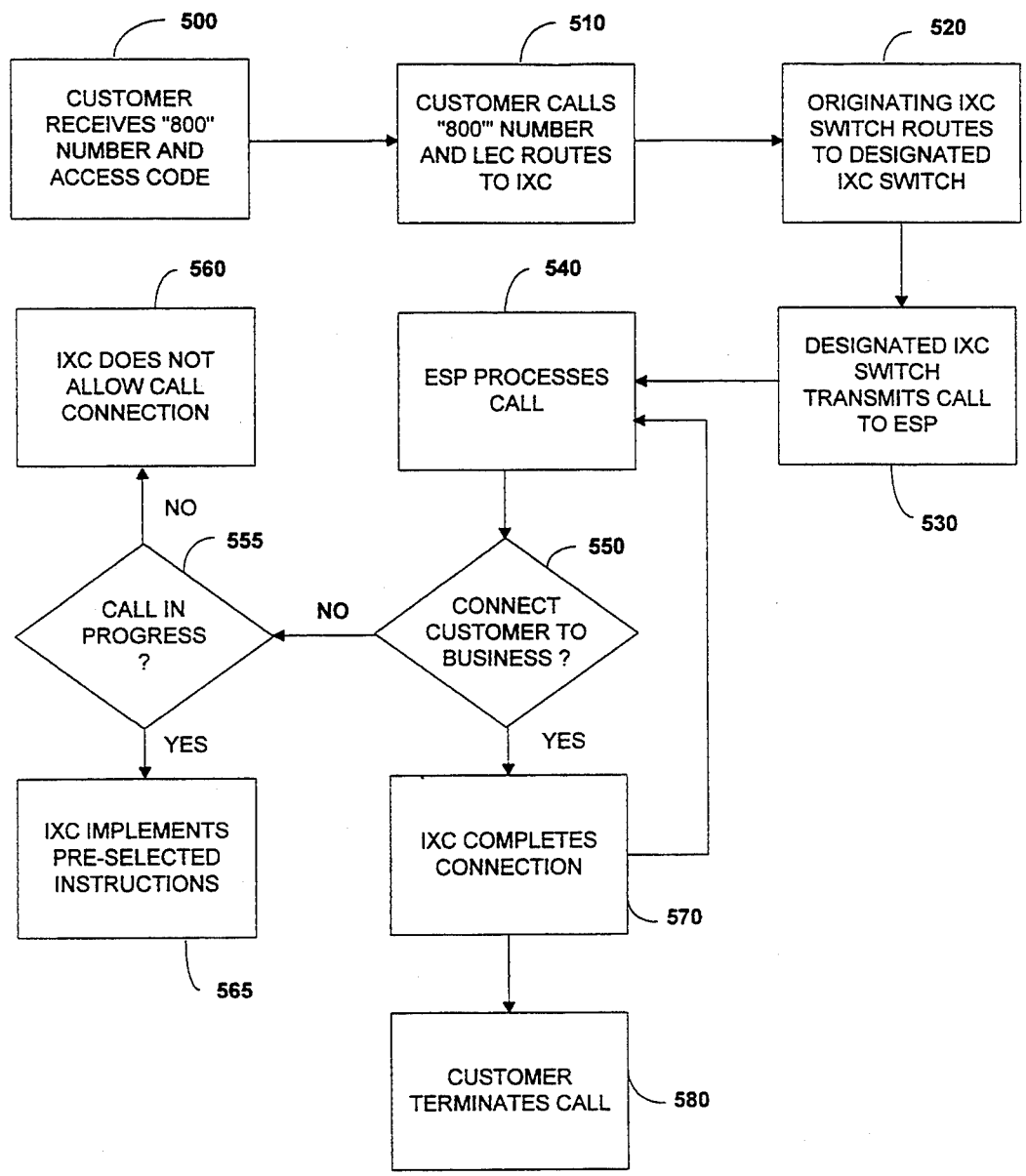
FIG. 3 is a flow diagram of a version of the present invention.

FIG. 3 represents a sequence for processing a call in accordance with one embodiment of the present invention. The sequence begins in box 500 with the customer receiving a telephone number and an access code. In a preferred embodiment, the telephone number is an "800" number, but other telephone number formats are equally applicable to the present invention. The access code is typically a sequence of numbers unique to a customer, and the preferred access code is a PIN. The access code can be specified by the business, the customer, or the telecommunications network.

The access code could also be the telephone number of the particular customer provided by the ANI. In that case, the access code would be collected by the ESP from the network and not from the customer. However, there advantages to using a PIN instead of an ANI. PINs are unique to customers and not phone lines. This offers greater distinction among users. The use of a PIN does not rest on the ability of any telecommunications network to deliver ANI. The use of ANI for the access code makes it difficult to identify the actual customer, and it is also dependent on the system's ability to generate and deliver ANI. An additional drawback to the use of ANI is that it is not portable with a customer who may need customer service when away from the designated phone line. One skilled in the art will recognize other advantages of using a PIN instead of ANI for the access code.

When the customer desires customer service, the customer will place a call to the business using the "800" number as shown in box 510. The call is made through the applicable LEC which recognizes the "800" number as requiring an IXC and routes the call to the appropriate IXC switch. This IXC switch is referred to as the originating switch. The originating IXC switch is programmed trigger when it receives an "800" call. The trigger launches a query to an SCP for an "800" translation. This process entails a table look-up and is well known in the art.

Typically, the SCP answers the query with a translation number which is used by the originating switch to select a trunk and switch code from an internal table. Alternatively, the SCP may answer the query with the trunk and switch code instead of a translation number. Also, the IXC switches could be programmed to accomplish this routing without SCP translation.

The trunk and switch code is used by the originating IXC switch to route the call to a designated IXC switch that has been assigned to the particular telephone number. The call then is routed to this designated IXC switch as shown in box 520. The designated switch uses the dialed number along with the trunk and switch code to select a program code from an internal table. Typically, there is a table for each trunk and switch code that is loaded with dialed number/program code combinations. The preferred program code is the "800" number used to place the call in either the 10 digit or 7 digit (drop the "800" prefix) format. The program code could also be an arbitrary number. The designated switch will also route the call to the ESP.

The designated IXC switch transmits the call to the ESP as shown in box 530. In the preferred embodiment, this is accomplished over a DAL. In this case, the IXC switch seizes a VRU port and transmits "* ANI * program code" in DTMF format, and then transmits the call. Other processes are also known to accomplish this.

As shown in box 540, the ESP processes the call. One embodiment for processing will be detailed below. Basically, the outcome of the processing is the determination if a connection from customer to business should be made. This is shown in box 550. If the determination is negative and the call is not in progress, the call is not allowed by the switching network as shown in boxes 555 and 560. If the determination is negative and the call is in progress, the IXC implements pre-selected instructions as shown in boxes 555 and 565. However, if the determination is positive, the ESP retrieves a destination code and instructs the switching to complete the connection as shown in box 570.

Once the call is in progress the ESP may continue to process the call and determine if any action should be taken as shown by boxes 540 and 550. If a negative determination is made during the call, the switching network implements pre-selected instructions as shown in boxes 555 and 565. These pre-selected instructions are specified by Business 30. Examples are call termination, routing to a live operator, or even allowing the call to terminate naturally, but disallowing future calls.

Those skilled in the art are aware of appropriate instructions in this situation. If no negative determinations are made during the call, the call terminates naturally by the customer as shown in box 580. The processing step can add numerous other features to this system, and some of these are discussed below.

Figure 4:
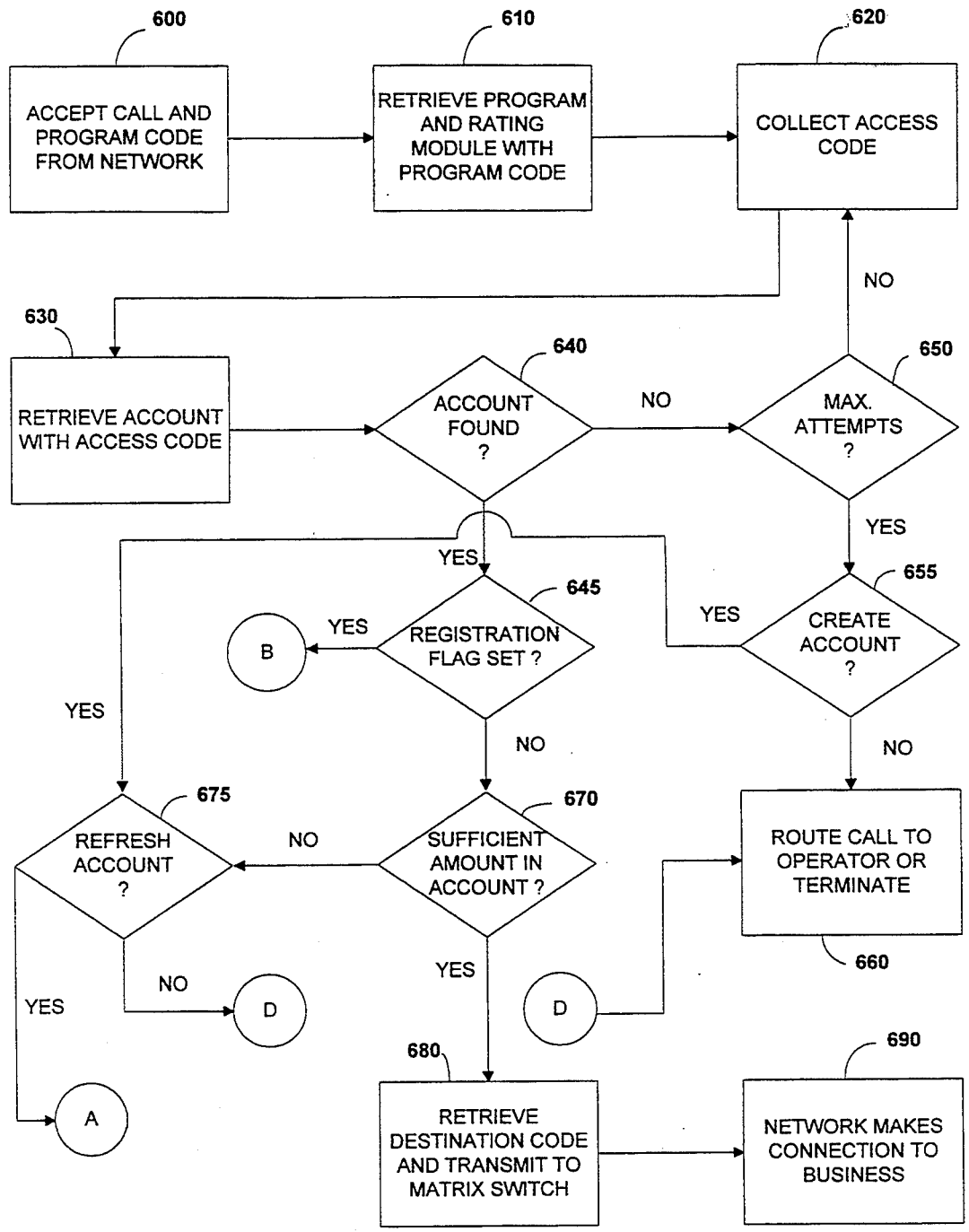
FIG. 4 is a flow diagram of call-set up in a version of the present invention.

FIG. 4 is a flow diagram depicting one form of call set-up processing by the ESP. As shown in box 600, the ESP accepts the call and the program code. As discussed, the program code is provided by the network, and it is typically the "800" number used to place the call. In the preferred embodiment, a VRU is the component of the ESP that accepts the call.

Box 610 shows that a program and a rating module are retrieved from storage based on the program code. The rating module is used to measure the call and will be discussed below. Using the program, the ESP will process the call. This program can be customized for each program code (which is typically the "800" number). Each program can be further customized for each access code. In one embodiment, the program will instruct the ESP to collect the access code from the customer as shown in box 620. The ESP can use automated voice prompts to collect the access code. Customers could respond to the voice prompts using pulse or DTMF signals, and the ESP could convert the input into digital data for processing. Alternatively, the ESP could employ standard voice recognition devices to accept a spoken response and convert it into digital data. Such devices that employ speaker independent recognition of the digits 0–9 are known in the art.

The ESP uses the access code to retrieve an account as shown in box 630. The account contains the amount of customer service telecommunications for which the access code is authorized. The amount of the account could be measured in numerous ways. Examples would be total minutes, total calls, a specific time frame (i.e. 90 days from the first call), total cost of calls in dollars, or arbitrary units. Such categories could be further broken down to reflect the time of day, the duration of the call, the ANI, or the type of customer service chosen. This would provide greater resolution in call tracking and measurement. The rating module allows the ESP to use standard call information to appropriately measure these amounts and modify the account accordingly.

Figure 6:
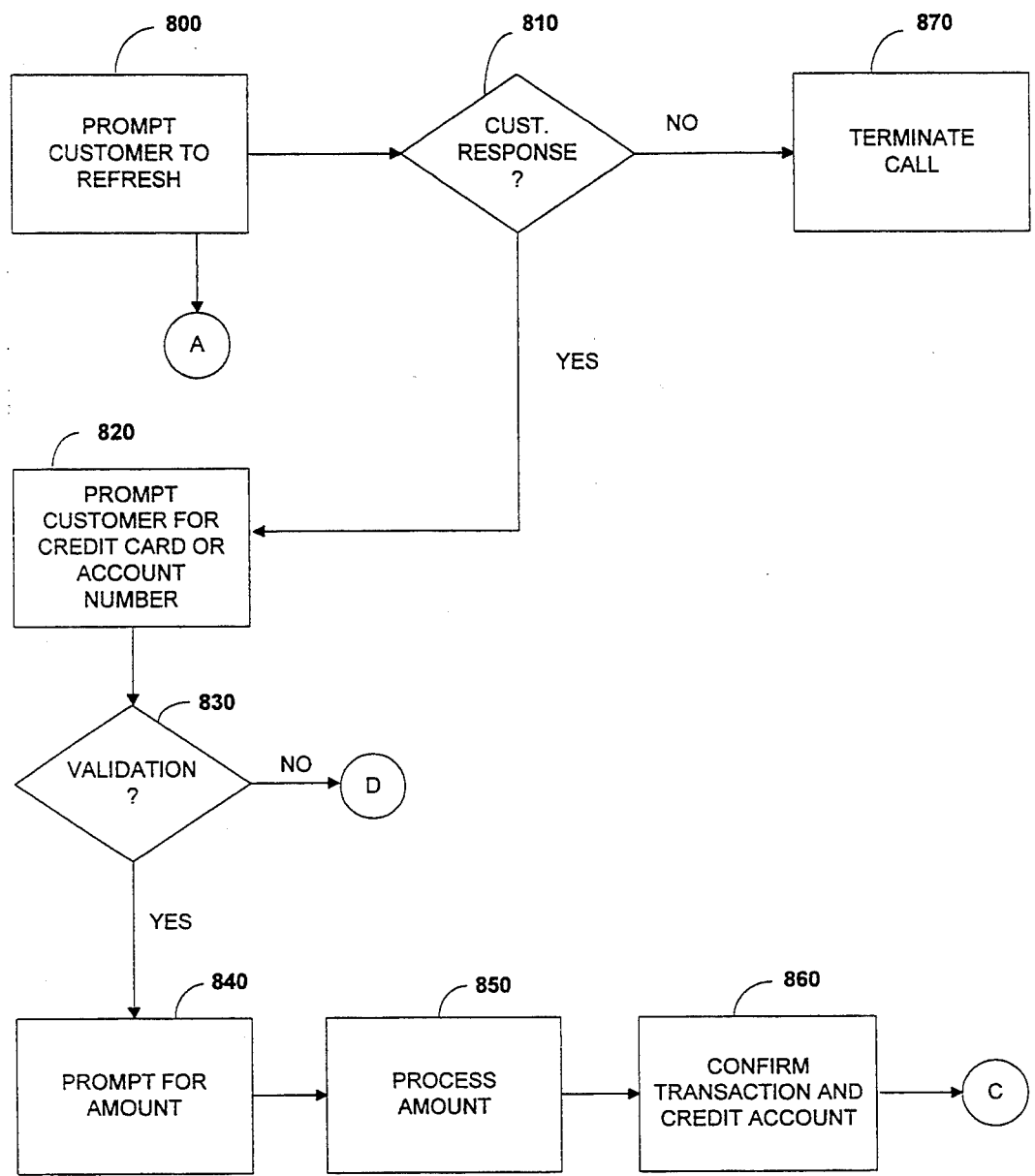
FIG. 6 is a flow diagram of account refreshability in a version of the present invention.

Box 640 depicts the two possibilities of attempted account retrieval. If no account is found, the ESP will request another access code input from the customer as shown in box 620. After a designated number of attempts is reached at box 650, the ESP will check a flag to determine if a new account may be set-up as shown in box 655. If so, the refresh sequence of FIG. 6 is entered as shown in box 675. If no new accounts are authorized, the call would be terminated or routed to live personnel for further processing as shown in box 660. The capability to offer new accounts in this situation is optional.

In one embodiment, if an account is found, the ESP checks to see if the registration flag is set as shown in box 645. If not the sequence continues to box 670. If the registration flag is set, the call enters the registration sequence of FIG. 7. In the alternative, the registration feature could be omitted.

The present invention is not restricted to the strict use of any single form a flag. In the context of the present invention, a flag is information that instructs the ESP whether or not to enter a particular optional logic sequence.

Box 670 shows the next determination that could be made. If a sufficient amount of customer service telecommunications is found in the account, the ESP retrieves a destination code as shown in box 680. The destination code may be the POTS telephone number of the customer service line of the business. The ESP transmits the destination code to the matrix switch which places a call through the switching network to the customer service line of the business as shown in boxes 680 and 690. The destination code could also be another "800" number and could employ additional "800" logic to process the call. If the destination code is not one of these numbers, the matrix switch would perform a look-up based on the destination code to determine the destination telephone number. As shown in box 690, when the call is placed, a connection is made in the ESP so that a seamless connection results from the customer to the business.

In one embodiment, if the amount of customer service telecommunications in an account is insufficient, the ESP would check for a refreshable flag as shown in box 675. If the flag is not set, the call will be handled according to box 660. If the flag is set, the ESP would enter the refresh sequence discussed in relation to FIG. 6. In the alternative, the refresh feature could be omitted.

Figure 5:
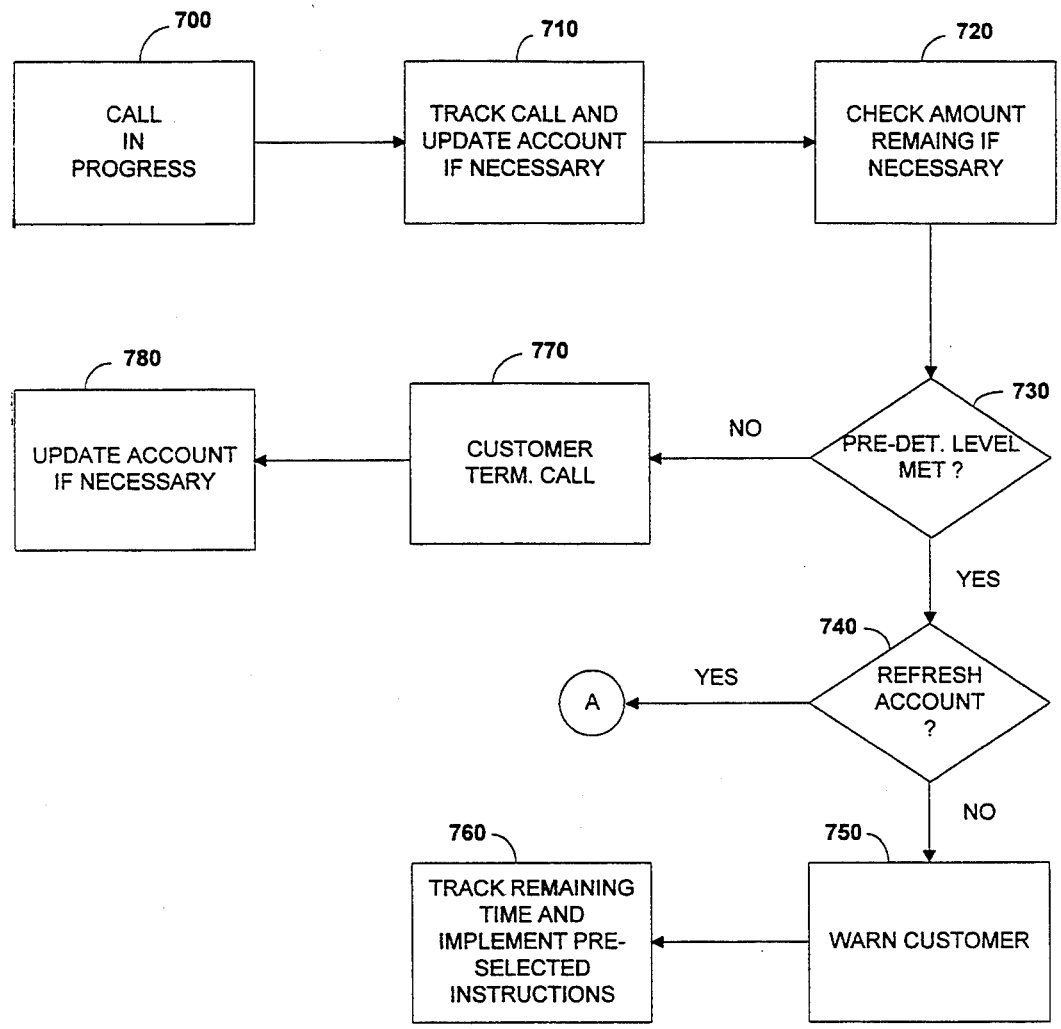
FIG. 5 is a flow diagram of call-in-progress in a version of the present invention.

FIG. 5 is a flow diagram of the standard call in progress sequence. The sequence continues from FIG. 4 in which the call is first connected from the customer to the business. Box 700 illustrates a call in progress. In box 710, the ESP tracks the call appropriately.

Appropriate tracking means that the call is measured in relation to the format of the account. For example, accounts measured by duration, such as minutes or dollars, would be monitored minute-by-minute. If the account is on a per call basis, only the number of calls needs to be monitored. If the account allows calls during a particular time frame, the date of the call would be compared to the allowed time frame, and the duration or number of calls would be unnecessary.

If necessary, the account is updated. Updating is necessary if it is required for the given account. For accounts measured by a duration factor, the amount of customer service remaining is updated. Per call accounts do not need such rigorous monitoring and only the number of calls is updated. Accounts based on a time frame need no updating since only the activation and expiration dates are required. One skilled in the art is aware of appropriate tracking and updating procedures and combinations of these procedures. The ESP may check the account at appropriate intervals during a call to determine the amount of customer service remaining as shown in box 720. As indicated by box 730, the ESP will continue this process if appropriate and until the amount drops to a pre-determined level.

In one embodiment, the customer may be offered the option of refreshing the account. As shown in box 740, the ESP will check to see if the refresh flag is set when the account drops to the predetermined level. If so, the refresh sequence of FIG. 6 is entered. If not, the ESP may warn the customer of the amount left as shown in box 750, but this step is not required. Final tracking and call processing is shown in box 760. If the pre-determined amount is not zero, the call is allowed to continue. Once the amount reaches zero, or if the pre-determined level was zero, the ESP implements pre-selected instructions.

The pre-selected instructions which are implemented when an account reaches a pre-determined point are specified by the business. Some businesses may to choose to terminate the call. Others may desire a live operator connection. Some may prefer to allow the call to terminate naturally even though no amount remains, but no further calls would be allowed. If the call terminates naturally as shown in box 770, the account is updated, if necessary, to reflect the amount of customer service telecommunications used on the call as shown in box 780.

FIG. 6 is a flow diagram depicting the refresh sequence. The refresh sequence is typically entered if no account is found, no amount remains in the account, or when the account reaches a pre-determined level. As discussed above, the ESP will check to see if the refresh flag is set. If it is, the refresh sequence begins.

Box 800 shows that the ESP prompts the customer in order to determine if the customer wants to add more customer service telecommunications to the account. Box 810 shows the customer decision. If the customer does not want to refresh, the call is terminated as shown in box 870. If the customer decides to refresh the account, the ESP would prompt the customer for a credit card or account number as shown in box 820. The ESP would then validate the number in one of the ways known in the art for such validation. Box 830 shows this determination. If the validation is refused, the call is terminated or routed to live personnel for further processing; as shown in box 660. If the validation is accepted, then the ESP would prompt the customer to input the amount of customer service telecommunications requested as shown in box 840. This amount would be in a form discussed above and the ESP would be able to access data to process the transaction as shown in box 850. This data would include the units of measurement, pricing, maximum/minimum amounts, and other relevant information. Once the transaction is confirmed by the customer and the ESP, the amount would be credited to the account as shown in box 860 and the call would return to its original sequence explained in connection with FIG. 4.

Figure 7:
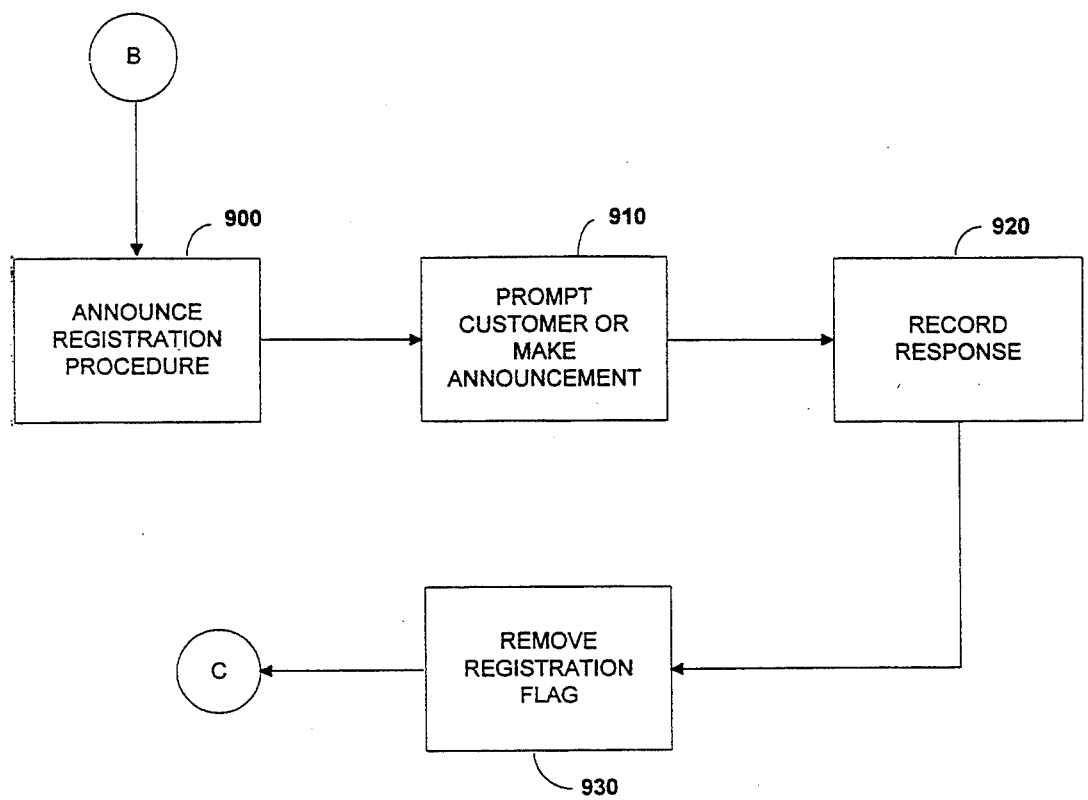
FIG. 7 is a flow diagram of registration in a version of the present invention.

FIG. 7 is a flow diagram showing the registration sequence. As discussed, once the ESP verifies that the registration flag is set, it enters the registration sequence. The registration sequence is premised on the idea that the ESP can collect particular customer information as a pre-requisite to customer service. Additionally, this is an appropriate stage of the call processing in which to make announcements to the customer. Box 900 shows that the ESP instructs the customer of the registration process and that their spoken answers will be recorded, or that their numerical answers may be entered using DTMF or pulse input. The ESP then prompts the customer for information as shown in box 910. The spoken answers would then be recorded on tape, or the DTMF/pulse inputs would be decoded and stored digitally as shown in box 920. Box 930 shows that the registration flag would then be removed and the call would return to its original sequence explained in connection with FIG. 4.

The registration feature has many applications. If the business wished to update or change the information collected, they could reset the registration flag and change the prompts accordingly. This feature has special value with regard to warranty registration and maintenance. This is because customers would be required to register their warranty and provide information before access to customer service. The feature could also be used to make announcements to customers. The announcements could be general for an entire program code or specific to a single access code. In that event, the information prompt and collection steps are simply eliminated. Other applications could be conducting customer surveys, or taking orders for goods and services.

The rating module referred to above can be customized for each program code. The rating module includes a rating table which is entered using the program code. A table entry which corresponds to the applicable program code lists a code which identifies the criteria used to track the account. The ESP then uses this code to retrieve the criteria. Some of this criteria has been discussed. Examples are minutes, dollars, calls, arbitrary units, and time frames. Minutes are tracked in a standard way. Arbitrary units and dollars are converted to minutes for tracking.

This criteria is used to track the account. The account is retrieved using the access code and may contain a number of minutes, dollars, or arbitrary units. This figure is updated using the criteria listed in the rating table for the program code and the elapsed time of the call. The criteria may also contain a cap to be used if a call exceeds a threshold. This protects the caller from inefficient customer service personnel. Alternatively, the criteria may instruct the ESP to track and update only the number of calls. Additionally, if the account is based on a time frame, the account holds the activation and expiration dates. No updating is required. The criteria in the rating table instructs the ESP to check the date of the call against these restraints. The activation and expiration dates may depend in part on when the first call is made. The criteria would instruct the ESP to establish these dates and load them into the account on the first call.

The present invention offers numerous advantages over prior art systems. It provides businesses with a telecommunications system that allows the business to control customer service. The system offers easy telephone access to the customer from any phone connected to the public network. This is required in today's market to ensure the business of a high level of participation by the customers. Unlike the prior art systems, however, the business is given the means to control this capability in a new way. By using program codes and access codes, the business can specify specific call processing instructions for each individual customer.

The business can establish amounts of free customer service, and provide for a cut-off once this amount is used up. The business can allow customers to purchase additional customer service as well. The business can also require automatic customer information collection prior to access. Using this feature, the business can make announcements to groups of customers, or to a specific customer. This adds a new dimension to customer/business interaction by automating a one-on-one communications to the individual customer who calls customer service.

The present invention allows the business these capabilities by a unique system that accepts "800" calls and identifies the specific customer, the program specified by the business, and information specific to the customer. Using this information, the use of customer service is tracked and controlled. Refreshability and registration features can be built into the programs or the customer information files. The system also controls the destination of the call. Despite providing the customer an account of telecommunications usage, the system directs calls from this account to the business, or its agents, only.

The present invention requires different intelligence than that used in previous systems because it allows the tracking of calls in many different formats, such as minutes or even a 90 day period of unlimited calling after initial registration. The special processing allows for automatic warranty registration over phone lines as a prerequisite to customer service. Other advantages of the present invention are recognized by those skilled in the art.

In an alternative embodiment, the access code is eliminated. In this case, customer service call will be handled the same, except the ESP enters the refresh sequence immediately upon accepting the call. Amounts are then purchased on a per call basis. The amount could be purchased in increments, such five minute segments, and repurchased as they are used up. A flat rate per call could also be used, or the customer could agree to pay for the actual call and is billed upon completion.

Those skilled in the art will recognize that the present invention is readily operable in other applications. The present invention is especially suited for applications in which a called party wants to provide convenient access through an "800" or similar number, but the called party wants to control the access and cost allocation of the telecommunications usage. For example, information and entertainment services that operate over telephone lines could use the present invention to control the access and billing of their services. As such, the present invention is not limited to the specific embodiments listed, but is commensurate with the scope of the following claims.

What is claimed is:

1. A telecommunications system for controlling customer service wherein a customer who is associated with an access code unique to the customer places a call using a telephone number associated with a business, and wherein the business has specified a call processing program which is associated with a program code, the system comprising:

a telecommunications network operable to accept the call, transmit signaling associated with the call, and make call connections;

a database operable to store the program and a plurality of data;

an interface means connected to the network for accepting the call from the network and collecting the program code from the network and the access code from the customer;

a first routing means for instructing the network to connect the customer to the interface means when the customer places the call using the telephone number associated with the business;

a second routing means for instructing the network to connect the interface means to the business so as to complete a connection from the customer to the business; and a processing means for processing the call accepted by the interface means, the processing means operable to retrieve the program stored in the database based on the program code, to retrieve an account of customer service telecommunications stored in the database based on the access code, to instruct the second routing means to complete the customer to business connection if a first pre-determined amount of customer service telecommunications is in the account to control customer service access, to implement pre-selected instructions indicative of the termination of customer service if a second pre-determined amount of customer service telecommunications is in the account, and to track and update the amount of customer service telecommunications in the account.

2. The telecommunications system of claim 1 wherein the program code is comprised of at least a portion of the telephone number used to place the call.

3. The telecommunications system of claim 1 wherein the access code is a Personal Identification Number (PIN).

4. The telecommunications system of claim 1 wherein the telecommunications network includes an Interexchange Carrier (IXC).

5. The telecommunications system of claim 1 wherein the telephone number is an "800" number.

6. The telecommunications system of claim 1 wherein the processing means is connected to a business database controlled by the business and the processing means is operational to retrieve information from the business database.

7. The telecommunications system of claim 1 wherein the processing means is connected to a business CPU controlled by the business and the processing means is operational to transmit information to the business CPU contemporaneously with the call.

8. The telecommunications system of claim 1 wherein the processing means is operational to collect customer information from the customer prior to allowing access to customer service.

9. The telecommunications system of claim 1 wherein the processing means is operational to make announcements to the customer prior to allowing access to customer service.

10. The telecommunications system of claim 1 wherein the processing means is operational to prompt the customer to add additional amounts of customer service telecommunications to the account when the account reaches a pre-determined level.

11. The telecommunications system of claim 1 wherein the amount in the account, and track and update of the amount in the account, is based on a number of minutes.

12. The telecommunications system of claim 1 wherein the amount in the account, and track and update of the amount in the account, is based on a number of calls.

13. The telecommunications system of claim 1 wherein the amount in the account, and track and update of the amount in the account, is based on a time frame.

14. A method for controlling customer service with a telecommunications system wherein a customer who is associated with an access code unique to the customer places a call using a telephone number associated with a business, and wherein the business has specified a call processing program which is associated with a program code, the method comprising the steps of:

accepting the call from the customer into a telecommunications network;

transmitting the call and associated call signaling to an interface if the customer placed the call using the telephone number associated with the business;

accepting the call into the interface and collecting the program code from the network and the access code from the customer;

retrieving the program stored in a database into a processor based on the program code and retrieving an account of customer service telecommunications stored in the database into the processor based on the access code;

connecting the interface to the business so as to complete a connection from the customer to the business if a first pre-determined amount of customer service telecommunications is in the account so that customer service access is controlled;

tracking and updating the amount of customer service telecommunications in the account; and implementing pre-selected instructions indicative of the termination of customer service if a second pre-determined amount of customer service telecommunications is in the account.

15. The method of claim 14 wherein the program code is comprised of at least a portion of the telephone number used to place the call.

16. The method of claim 14 wherein the access code is a Personal Identification Number (PIN).

17. The method of claim 14 wherein the telecommunications network includes an Interexchange Carrier (IXC).

18. The method of claim 14 wherein the telephone number is an "800" number.

19. The method of claim 14 further including the step of retrieving information from a business database controlled by the business into the processor.

20. The method of claim 14 further including the step of transmitting information to a business CPU controlled by the business contemporaneously with the call.

21. The method of claim 14 further including the step of collecting customer information from the customer prior to allowing access to customer service.

22. The method of claim 14 further including the step of making an announcement to the customer prior to allowing access to customer service.

23. The method of claim 14 further including the step of prompting the customer to add additional amounts of customer service telecommunications to the account when the account reaches a pre-determined level.

24. The method of claim 1 wherein the amount in the account, and the tracking and updating of the amount in the account, is based on a number of minutes.

25. The method of claim 1 wherein the amount in the account, and the tracking and updating of the amount in the account, is based on a number of calls.

26. The method of claim 1 wherein the amount in the account, and the tracking and updating of the amount in the account, is based on a time frame.

27. A telecommunications system for controlling customer service in which a customer places a call using a telephone number associated with a business, and wherein the business has specified a call processing program which is associated with a program code, the system comprising:

a telecommunications network operable to accept the call, transmit signaling associated with the call, and make call connections;

a database operable to store programs and data;

an interface means for accepting the call and the program code from the network;

a first routing means for instructing the network to connect the customer to the interface means when the customer places the call using the telephone number associated with the business;

a second routing means for instructing the network to connect the interface means to the business so as to complete a connection from the customer to the business; and a processing means for processing the call accepted by the interface means, the processing means operable to retrieve the program stored in the database based on the program code, to prompt the customer to obtain amounts of customer service telecommunications, to instruct the second routing means to complete the customer to business connection if the customer obtains a first pre-determined amount of customer service telecommunications so that access to customer service is controlled, to track the amount of customer service telecommunications used by the customer, and to implement pre-selected instructions indicative of the termination of customer service if a second pre-determined amount of customer service telecommunications is in the account.

28. A method for controlling customer service with a telecommunications system in which a customer places a call using a telephone number associated with a business, and wherein the business has specified a call processing program which is associated with a program code, the method comprising the steps of:

accepting the call from the customer into a telecommunications network;

transmitting the call and associated call signaling to an interface if the customer placed the call using the telephone number associated with the business;

accepting the call into the interface and collecting the program code from the network;

retrieving the program stored in a database into a processor based on the program code;

prompting the customer to obtain an amount of customer service telecommunications;

connecting the interface to the business so as to complete a connection from the customer to the business if the customer obtains a first pre-determined amount of customer service telecommunications so that customer service access is controlled;

tracking the amount of customer service telecommunications used by the customer; and implementing pre-selected instructions indicative of the termination of customer service if a second pre-determined amount of customer service telecommunications is in the account.

29. A telecommunications system wherein a first party who is associated with an access code unique to the first party places a call using a telephone number associated with a second party, and wherein the second party has specified a call processing program which is associated with a program code, the system comprising:

a telecommunications network operable to accept the call, transmit signaling associated with the call, and make call connections;

a database operable to store the program and a plurality of data;

an interface means connected to the network for accepting the call from the network and collecting the program code from the network and the access code from the first party;

a first routing means for instructing the network to connect the first party to the interface means when the first party places the call using the telephone number associated with the second party;

a second routing means for instructing the network to connect the interface means to the second party so as to complete a connection from the first party to the second party; and a processing means for processing the call accepted by the interface means, the processing means operable to retrieve the program stored in the database based on the program code, to retrieve an account of telecommunications stored in the database based on the access code, to instruct the second routing means to complete the first party to second party connection if a first pre-determined amount of telecommunications is in the account to control access to customer service, to implement pre-selected instructions indicative of the termination of customer service if a second pre-determined amount of telecommunications is in the account, and to track the amount of telecommunications in the account.

30. A method for controlling a telecommunications system wherein a first party who is associated with an access code unique to the first party places a call using a telephone number associated with a second party, and wherein the second party has specified a call processing program which is associated with a program code, the method comprising the steps of:

accepting the call from the first party into a telecommunications network;

transmitting the call and associated call signaling to an interface if the first party placed the call using the telephone number associated with the second party;

accepting the call into the interface and collecting the program code from the network and the access code from the first party;

retrieving the program stored in a database into a processor based on the program code and retrieving an account of telecommunications stored in the database into the processor based on the access code;

connecting the interface to the second party so as to complete a connection from the first party to the second party if a first pre-determined amount of telecommunications is in the account to control access to customer service;

tracking and updating the amount of telecommunications in the account; and implementing pre-selected instructions indicative of the termination of customer service if a second pre-determined amount of telecommunications is in the account.

* * * * *

UNITED STATES PATENT AND TRADEMARK OFFICE
CERTIFICATE OF CORRECTION

PATENT NO. : 5,448,633
DATED : September 5, 1995
INVENTOR(S) : Barbara H. Jamaleddin, Adrian Toader,
Jose A. Valdez, Ruben J. Zaragoza It is certified that error appears in the above-indentified patent and that said Letters Patent is hereby corrected as shown below:

On the title page:Item [73] delete "Spring" and substitute -- Sprint --.

Signed and Sealed this

Seventh Day of January, 1997

Attest:

BRUCE LEHMAN

*Attesting Officer*     *Commissioner of Patents and Trademarks*